United States Patent Office 3,106,549
Patented Oct. 8, 1963

3,106,549
POLYMERS OF LOWER ALKYL GLYCIDATES
Edwin J. Vandenberg, Wilmington, Del., assignor to Hercules Powder Company, Wilmington, Del., a corporation of Delaware
No Drawing. Filed Aug. 24, 1959, Ser. No. 835,439
8 Claims. (Cl. 260—78.3)

This invention relates to new polymeric substances and particularly to crystalline polymers of lower alkyl glycidates.

According to this invention it has been discovered that the lower alkyl esters of glycidic acid,

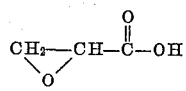

may be polymerized with the polymerization taking place through the epoxy group to yield high molecular weight polymers which are shown to be highly crystalline by X-ray diffraction. The new polymers of this invention are solid, linear polyethers having $$\left[ \begin{array}{c} -CH_2-CH-O- \\ | \\ C=O \\ | \\ OR \end{array} \right]$$

repeating units, in which R is a lower alkyl group having from 1 to 4 carbon atoms in the alkyl group. They are believed to have an isotactic structure. These crystalline polymers are useful for the preparation of films, fibers and molded articles.

Any lower alkyl ester of glycidic acid may be polymerized to produce the new crystalline polymers of this invention. These epoxy esters have the general formula

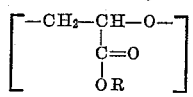

in which R is a lower alkyl group having from 1 to 4 carbon atoms and including methyl, ethyl, propyl, isopropyl, butyl, isobutyl, secondary butyl and tertiary butyl groups. Branched chain alkyl groups lead to the formation of polymers having higher melting points than polymers of alkyl glycidate esters having linear (straight chain) alkyl groups of the same number of carbon atoms. These alkyl glycidate esters may be prepared by reacting the corresponding alkyl acrylate esters with peroxytrifluoroacetic acid in the presence of a buffer such as disodium hydrogen phosphate, sodium carbonate, or sodium bicarbonate by the method of W. D. Emmons and A. S. Pagano in J. Am. Chem. Soc., vol. 77, page 89 (1955). As illustrative, ethyl glycidate was prepared by reacting ethyl acrylate with peroxytrifluoroacetic acid in the presence of disodium hydrogen phosphate as buffering agent.

The new polymers of this invention may be prepared by contacting a lower alkyl ester of glycidic acid with an aluminum alkyl as catalyst. Any aluminum alkyl may be used, as, for example, a trialkylaluminum, a dialkylaluminum monohalide, a dialkylaluminum monohydride, a monoalkylaluminum dihydride, a dialkylaluminum monoalkoxide, etc. The alkylaluminum compound may be used as such or it may be complexed with an ether such as tetrahydrofuran, or reacted with a chelating agent such as acetylacetone, or with water within specified molar ranges. When the alkylaluminum compound is reacted with water, the amount of water will usually be within the range of 0.5 to 1 mole of water per mole of alkylaluminum compound, but a ratio of from about 0.1:1 to about 2:1 may be used. The alkyl group of the alkylaluminum compound may be any alkyl, as, for example, methyl, ethyl, butyl, isobutyl, hexyl, octyl, etc.

The polymerization reaction may be carried out in bulk but generally is carried out in a solution or suspension in an inert organic diluent. Exemplary of the diluents that may be used are the ethers such as diethyl ether, dipropyl ether, etc., halogenated hydrocarbons such as chlorobenzene, methylene chloride, etc., or a hydrocarbon diluent such as n-heptane, cyclohexane, benzene, toluene, etc.

The polymerization reaction may be carried out at any desired temperature and pressure. Usually atmospheric or autogenous pressure will be used and a temperature of from about —80° C. to about 150° C. and preferably from about 0° C. to about 100° C. will be used.

The following examples will illustrate the preparation of the new polymers of the lower alkyl esters of glycidic acid. All parts and percentages are by weight unless otherwise indicated. The molecular weight of the polymers is shown by their reduced specific viscosity (RSV). By the term "reduced specific viscosity" is meant the $\eta_{sp}/c$ determined on a solution of the polymer in alpha chloronaphthalene at 135° C. Where the melting point of the polymer is given, it is the temperature at which the birefringence due to crystallinity disappears.

Example 1

A polymerization vessel in which air had been replaced with nitrogen was charged with 1.4 parts diethyl ether and 1 part ethyl glycidate, and after equilibrating at 30° C. an initial solution of catalyst was injected. This initial catalyst was a 1 molar solution in n-heptane of triisobutylaluminum complexed with tetrahydrofuran in the ratio of 1 mole of triisobutylaluminum to 1 mole tetrahydrofuran, and 0.56 part of this catalyst solution was employed. After 17.5 hours at 30° C., 0.56 part of a 1 molar solution of triisobutylaluminum was added as additional catalyst to the polymerization reaction mixture, and after 138 hours at 30° C., 4 parts of anhydrous ethanol was added to stop the polymerization reaction. The polymer was precipitated by adding 24 parts methanol and 0.8 part of a 10% solution of hydrogen chloride in methanol. The methanol-insoluble polymer was collected, washed neutral with methanol and then was washed once with methanol containing 0.05% of 4,4'-thiobis(6-tert-butyl-m-cresol). The washed polymer was then dried 16 hours at 50° C. under vacuum. The poly(ethyl glycidate) so obtained was a tough, somewhat rubbery, filmlike solid which was highly crystalline by X-ray diffraction.

The diffraction lines of the X-ray powder pattern had the following crystal lattice spacings and relative intensities:

| Crystal Lattice Spacing, A. | Approximate Relative Intensity (on a scale of 10 with 10 representing maximum intensity) |
|---|---|
| 9.11 | 10 |
| 5.75 | 5 |
| 5.03 | 5 |
| 4.31 | 7 |
| 3.99 | 3 |
| 3.04 | 2 |
| 2.70 | 1 |
| 2.40 | 1 |

Example 2

A mixture of 1.7 parts of ethyl glycidate and 4.5 parts of diethyl ether under a nitrogen atmosphere was cooled to —78° C. and 0.08 part of triethylaluminum which had been pre-reacted with 0.6 mole of water per mole of aluminum in 0.8 part of diluent (68% diethyl ether and 32% n-heptane) was added. The polymerization reaction mixture was held at −78° C. for 17 hours, then at −40° C. for 22 hours, then at −18° C. for 33 hours and at 5° C. for 44 hours. Then 0.08 part of triethylaluminum which had been pre-reacted with 1 mole of acetylacetone per mole of aluminum and then 0.5 mole of water per mole of aluminum in 0.9 part of diluent (68% diethyl ether and 32% n-heptane) was added. The polymerization was continued for 67 hours at 5° C., after which 0.7 part of anhydrous ethanol was added. The polymer was precipitated by adding 40 parts of methanol and 1.6 parts of a 10% solution of hydrogen chloride in methanol. The methanol-insoluble polymer was collected, washed neutral with methanol and then with methanol containing 0.2% of 4,4′-thiobis(6-tert-butyl-m-cresol) and dried. The poly(ethyl glycidate) so obtained was a tough, somewhat rubbery, filmlike solid. It was largely insoluble in boiling benzene, but dissolved in boiling cyclohexanone and, after filtering and concentrating until viscous, it was recovered by heptane precipitation. The purified polymer was collected, washed twice with ether and dried. It was a tough, white, somewhat rubbery solid which was demonstrated to be crystalline by X-ray diffraction, with the same X-ray pattern as described in Example 1. Its infrared spectrum was in accord with the assigned structure for poly(ethyl glycidate). It had a crystalline melting point of 129° C. and an RSV greater than 0.2. A sample of the polymer was pressed into a film above its melting point. After cooling to room temperature the film was tough and could be oriented by cold drawing.

This application is a continuation-in-part of my co-pending application Serial No. 738,626, filed on May 29, 1958.

What I claim and desire to protect by Letters Patent is:

1. As a new composition of matter a crystalline homopolymer of a lower alkyl ester of glycidic acid having

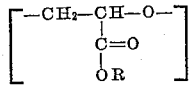

repeating units, in which R is a straight chain alkyl group having from 1 to 4 carbon atoms, said homopolymer exhibiting a crystalline-type X-ray diffraction powder pattern and having a reduced specific viscosity of at least about 0.2 as measured in α-chloronaphthalene at 135° C.

2. As a new composition of matter a crystalline homopolymer of a lower alkyl ester of glycidic acid having

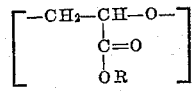

repeating units, in which R is a branched chain alkyl group having from 3 to 4 carbon atoms, said homopolymer exhibiting a crystalline-type X-ray diffraction powder pattern and having a reduced specific viscosity of at least about 0.2 as measured in α-chloronaphthalene at 135° C.

3. As a new composition of matter a crystalline homopolymer of methyl glycidate, having a substantially linear polyether structure, exhibiting a crystalline-type X-ray diffraction powder pattern, and having a reduced specific viscosity of at least about 0.2 as measured in α-chloronaphthalene at 135° C.

4. As a new composition of matter a crystalline homopolymer of ethyl glycidate, having a substantially linear polyether structure, exhibiting a crystalline-type X-ray diffraction powder pattern, and having a reduced specific viscosity of at least about 0.2 as measured in α-chloronaphthalene at 135° C.

5. As a new composition of matter a crystalline homopolymer of isopropyl glycidate, having a substantially linear polyether structure, exhibiting a crystalline-type X-ray diffraction powder pattern, and having a reduced specific viscosity of at least about 0.2 as measured in α-chloronaphthalene at 135° C.

6. As a new composition of matter a crystalline homopolymer of secondary butyl glycidate, having a substantially linear polyether structure, exhibiting a crystalline-type X-ray diffraction powder pattern, and having a reduced specific viscosity of at least about 0.2 as measured in α-chloronaphthalene at 135° C.

7. As a new composition of matter a crystalline homopolymer of tertiary butyl glycidate, having a substantially linear polyether structure, exhibiting a crystalline-type X-ray diffraction powder pattern, and having a reduced specific viscosity of at least about 0.2 as measured in α-chloronaphthalene at 135° C.

8. As a new composition of matter a crystalline homopolymer of an alkyl glycidate wherein said alkyl group contains from 1–4 carbon atoms, said homopolymer being characterized by having a substantially linear polyether structure, exhibiting a crystalline-type X-ray diffraction powder pattern, and having a reduced specific viscosity of at least about 0.2 as measured in α-chloronaphthalene at 135° C.

References Cited in the file of this patent

UNITED STATES PATENTS

| | | |
|---|---|---|
| 2,680,109 | Stevens et al. | June 1, 1954 |
| 2,706,182 | Pruitt et al. | Apr. 12, 1955 |
| 2,871,219 | Baggett et al. | Jan. 27, 1959 |
| 2,916,463 | Blanchette | Dec. 8, 1959 |

FOREIGN PATENTS

| | | |
|---|---|---|
| 477,843 | Great Britain | Jan. 3, 1938 |

OTHER REFERENCES

Organic Reactions, vol. V, pages 413–440, John Wiley & Sons, Inc., N.Y., 1949.

Paquin: "Epoxydverbindungen und Epoxydharze," page 247, Springer-Verlag, Berlin, Germany, 1958.

Miller et al.: Journal of Polymer Science, vol. 44, pages 391–5 (1960).